United States Patent [19]
Aizawa et al.

[11] Patent Number: 5,526,343
[45] Date of Patent: Jun. 11, 1996

[54] AUXILIARY SERVICE CHANNEL SIGNAL TRANSMISSION SYSTEM

[75] Inventors: Shigemi Aizawa; Toshio Kawasaki, both of Kawasaki, Japan

[73] Assignee: Fujitsu Limited, Japan

[21] Appl. No.: 278,158

[22] Filed: Jul. 21, 1994

[30] Foreign Application Priority Data

Jan. 19, 1994 [JP] Japan ..................... 6-019877

[51] Int. Cl.⁶ ..................................... H04J 1/16
[52] U.S. Cl. ................. 370/13.1; 370/26; 370/30; 370/50; 370/75; 375/213; 375/214
[58] Field of Search ................. 370/30, 15, 35, 370/16, 69.1, 74, 75, 102, 98, 13.1, 76, 97, 50, 70, 55, 26; 379/4, 343, 344; 371/20.2; 375/221, 213, 214

[56] References Cited

U.S. PATENT DOCUMENTS

| | | | |
|---|---|---|---|
| 2,666,845 | 11/1951 | Colton et al. ............... | 370/75 |
| 4,101,738 | 7/1978 | Bellanser et al. .......... | 370/74 |
| 4,197,496 | 3/1980 | Hiyama ......................... | 370/74 |

*Primary Examiner*—Alpus H. Hsu
*Assistant Examiner*—Ricky Ngo
*Attorney, Agent, or Firm*—Staas & Halsey

[57] ABSTRACT

A transmission system for an auxiliary signal which is extracted from/inserted into a terminal office and for an IF repeater office for digital multiplexing microwave communications. The auxiliary signal transmission system multiplexes the frequencies of primary signals, and performs a communications operation between a terminal office pair and repeater offices that are located between the pair of terminal offices for extraction/insertion of auxiliary signals. In this system, the frequencies of the auxiliary signals are provided in the vacant areas in the frequency bands of the primary signals, and the auxiliary signals are transmitted from the repeater offices in a time-sharing manner.

14 Claims, 14 Drawing Sheets

AUXILIARY SERVICE CHANNEL SIGNAL TRANSMISSION SYSTEM

BACKGROUND OF THE INVENTION

1. Field of the Invention

The present invention relates to an auxiliary service channel signal transmission system, and particularly to a transmission system for auxiliary service channel signals that are extracted/inserted by digital multi-microwave transmission terminal offices and IF repeater offices.

2. Description of the Related Art

An example of such a conventional technique for an auxiliary service channel signal transmission system is described in Japanese Unexamined Patent Publication No. Hei 2-277328. In the disclosed technique, which is one transmission method for auxiliary service channel (ASC) signals, such as monitor signals for IF repeater offices and order wires, the auxiliary signal is employed to perform FM modulation on a primary signal carrier and the FM-modulated signal is transmitted to a repeater office or other terminal office.

In the conventional method, the FM-modulated wave components must be removed from a carrier before the primary signal is demodulated.

For the reception of auxiliary signals, a circuit that is employed to cancel FM-modulated wave components is provided at the reception side of a repeater office or a terminal office.

The employment of such a circuit complicates the structures of the terminal and the repeater offices, and the wave components that were FM modulated by employing the auxiliary signal cannot be sufficiently removed. Some FM-modulated wave components remain as the phase jitter of a carrier.

Although a 4-phase PSK modulation system is still applicable for the conventional system, multi-phase modulation systems, such as a 16 QAM, a 64 QAM, and a 256 QAM, are not applicable because their S/N is unsatisfactory.

SUMMARY OF THE INVENTION

It is therefore an object of the present invention to provide an auxiliary service channel signal transmission system that overcomes the shortcomings of the conventional system.

It is another object of the present invention to provide an auxiliary signal transmission system whereby a plurality of repeater offices can extract/insert an auxiliary signal, and whereby an auxiliary signal, whose frequency is positioned in an empty area of the frequency band of a primary signal, can be transmitted by a repeater office in a time-sharing manner.

It is an additional object of the present invention to provide an auxiliary signal transmission system whereby a repeater office transmits an auxiliary signal after a given time has elapsed following the transmission of an auxiliary signal by a terminal office.

It is a further object of the present invention to provide an auxiliary signal transmission system that assigns a different transmission time interval to each of the repeater offices.

It is still another object of the present invention to provide an auxiliary signal transmission system by which an auxiliary signal that is transmitted as a reference signal by one terminal office is returned by the other terminal office.

It is a still further object of the present invention to provide an auxiliary signal transmission system by which an auxiliary signal from a plurality of repeater offices is transmitted after a given time has elapsed following the relay of an auxiliary signal by an immediately preceding terminal office.

It is a still furthermore object of the present invention to provide an auxiliary signal transmission system by which an auxiliary signal from a plurality of repeater offices is transmitted after a given time has elapsed following the relay of the reception of an auxiliary signal by an immediately preceding terminal office.

It is yet another object of the present invention to provide an auxiliary signal transmission system that ensures a common transmission time interval for each of the repeater offices.

It is yet an additional object of the present invention to provide an auxiliary signal transmission system whereby, when a signal has not been received by a repeater office after a given time has elapsed following the transmission of an auxiliary reference signal by a terminal office, the repeater office serves as an originating office and transmits an auxiliary reference signal to the next repeater office.

It is yet one further object of the present invention to provide an auxiliary signal transmission system whereby a given transmission interval is employed when a predetermined count of bursts is not received.

It is one more object of the present invention to provide an auxiliary signal transmission system whereby a transmission path is altered when a signal is not received by a repeater office after a given time has elapsed, and the repeater office serves as an originating terminal office and transmits an auxiliary reference signal to the next repeater office.

It is still one more object of the present invention to provide an auxiliary signal transmission system whereby bidirectional transmission of signals is enabled after a transmission path is altered to avoid defective transmission intervals.

Other objects of the present invention will become apparent during the course of the following detailed explanation and the description of the scope of the present invention.

DETAILED DESCRIPTION OF THE PREFERRED EMBODIMENTS

Figure 1:
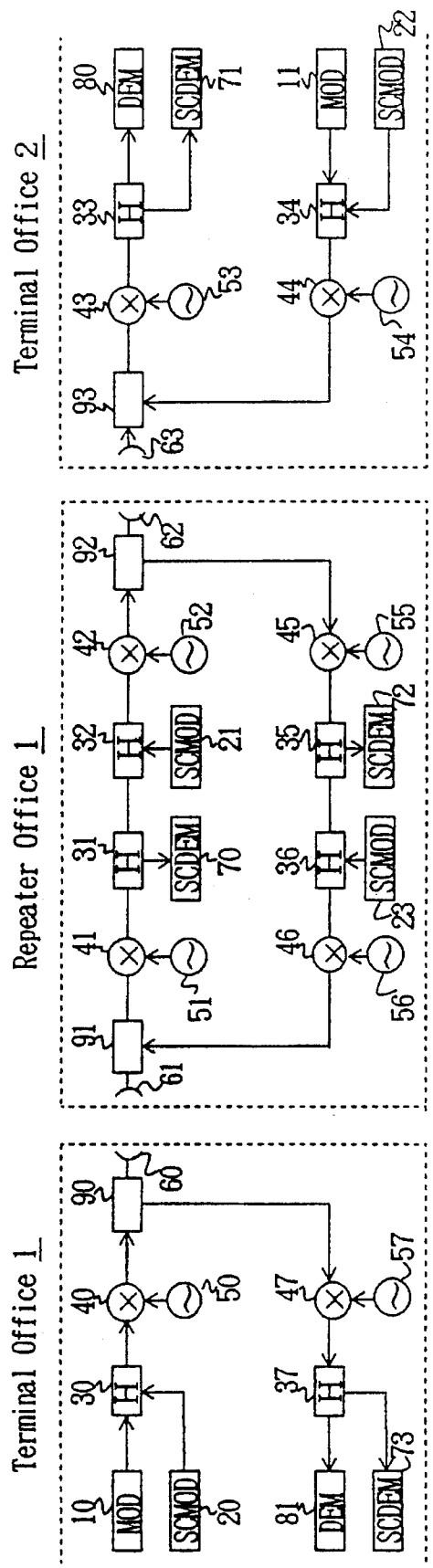
FIG. 1 is a block diagram for explaining the general structure of the present invention.

FIG. 1 is a block diagram for explaining the general structure of terminal offices and repeater offices according to the present invention. In FIG. 1, since the repeater offices are all structured alike, for this explanation only one repeater office 1 is located between a terminal office 1 and a terminal office 2.

Throughout the following descriptions, the same reference numerals are used to denote and identify corresponding or identical components.

At the terminal office 1 in FIG. 1, multi-value QAM phase modulation is performed on a primary signal by a primary signal modulator 10, and the modulated signal is sent to a hybrid circuit 30. PSK modulation is performed on an auxiliary signal (ASC), which is the feature of the present invention, by an auxiliary signal modulator 20. The modulated signal is then transmitted to the hybrid circuit 30 and mixed with the previous primary signal. The resultant signal is then output.

Figure 3:
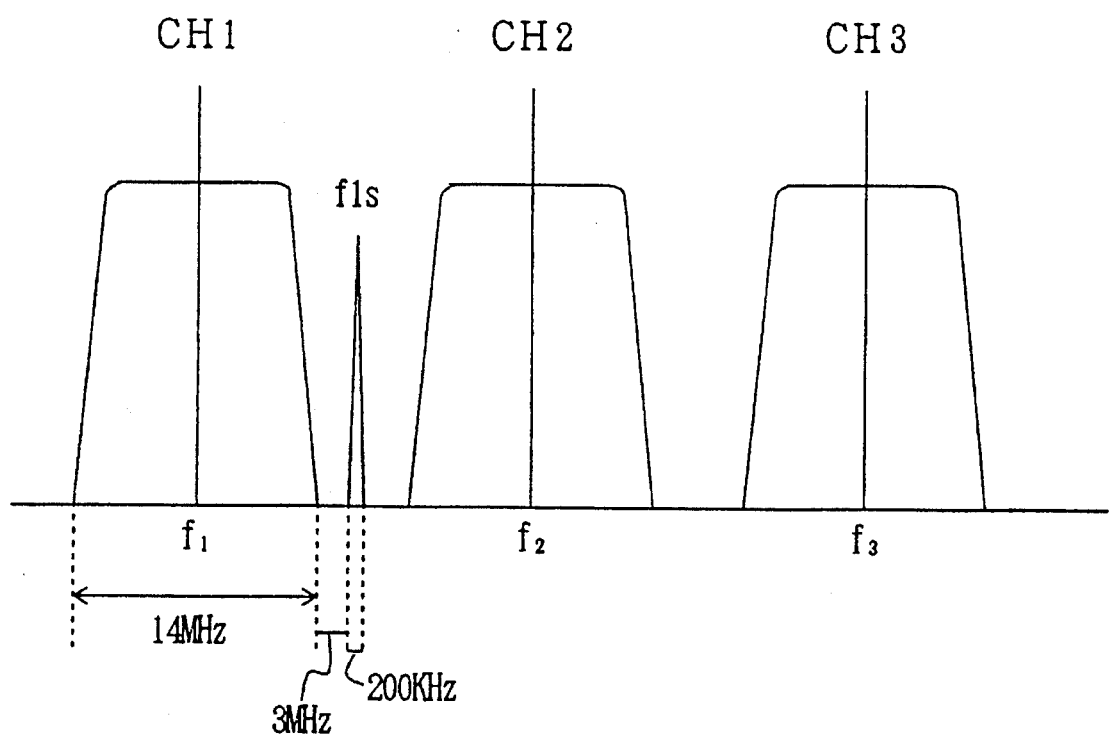
FIG. 3 is a diagram showing an example of the positions of a primary signal and an auxiliary signal.

In this embodiment, primary signals are provided for, as an example, three channels (CH1 to CH3), which are allocated in the frequency domains whose center frequencies are f1, f2 and f3, shown in FIG. 3.

The present invention takes advantage of the fact that in the primary signal frequency domains for multiple channels there are unoccupied areas between the channels. Thus, auxiliary signals (ASC) are inserted in areas that correspond to the channels. In FIG. 3 of the embodiment, an auxiliary signal that is output by the auxiliary signal modulator 20 of the terminal office 1 is modulated with a center frequency f1s.

The values of frequencies shown in FIG. 3 represent examples of the frequency band widths of the primary signals, the frequency band widths of the auxiliary signals and the intervals of the frequency domains of the primary and auxiliary signals.

Further explanation will also include references to FIG. 1.

The primary signals and the auxiliary signals, shown in FIG. 3, which are output by the hybrid circuit 30, are sent to a mixer 40, which mixes these signals with a carrier signal sent from a carrier frequency oscillator 50. The mixed signal is converted into a signal that has a carrier frequency, and is sent to a frequency divider 90 and finally transmitted through an antenna 60 to the repeater office 1.

Figure 2:
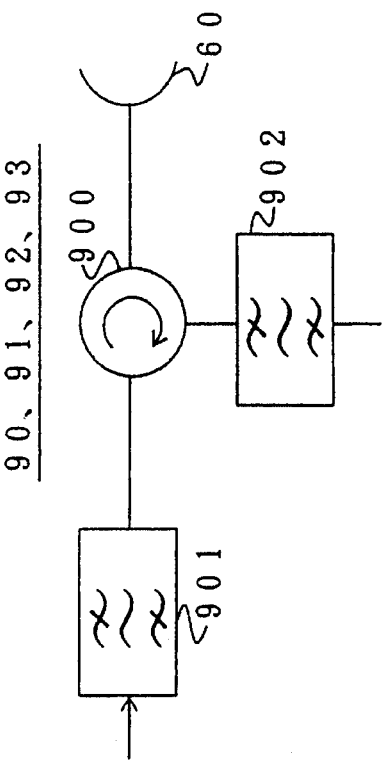
FIG. 2 is a block diagram illustrating an example structure of a wave-dividing circuit.

The frequency divider 90 includes a circulator 900, and band filters 901 and 902, as shown in FIG. 2. One end of the circulator 900 is connected to the antenna 60, and one end of each of the band filters 901 and 902 is connected to a mixer 40 or 47. Frequency dividers 91 to 93 at the repeater office 1 and the terminal office 2 have the same structure.

At the repeater office 1, a signal from the terminal office 1 is received by an antenna 61 and sent to the frequency divider 91. The output of the frequency divider 91 is then mixed with a carrier signal from a carrier frequency oscillator 51 by the mixer 41, and the resultant signal is converted to a signal that has an IF band frequency.

The converted signal that has the IF band frequency is extracted (dropped) from a hybrid circuit 31 by an auxiliary signal demodulator 70, and is demodulated. Then, at the repeater office 1, an auxiliary signal that has the frequency allocation shown in FIG. 3 is reinserted into the primary signal by an auxiliary signal modulator 21 via a hybrid circuit 32.

The auxiliary signal inserted by the hybrid circuit 32 and the primary signal are mixed with a carrier signal, from a carrier frequency oscillator 52, by the mixer 42, and the mixed signal is converted into a signal that has a carrier frequency. The converted signal is routed through the frequency divider 92 and transmitted by an antenna 62 to the terminal office 2.

The signal is received at an antenna 63 at the terminal office 2, and routed through the frequency divider 93. The signal is then mixed with a carrier signal from a carrier frequency oscillator 53 by the mixer 43, and the mixed signal is converted to a signal that has an IF band frequency.

The converted signal that has an IF band frequency is distributed by a hybrid circuit 33, and the signals are received as a primary signal and an auxiliary signal by a primary signal demodulator 80 and an auxiliary signal demodulator 71, respectively.

The upstream circuit transmission of an auxiliary signal that is to be inserted into a primary signal according to the present invention has been described above.

The downstream circuit transmission of an auxiliary signal is performed in the same manner. More specifically, at the terminal office 2, the primary signal from a primary signal modulator 11 and the auxiliary signal from an auxiliary signal modulator 22 are routed through a hybrid circuit 34 to the mixer 44.

Both signals are mixed with a carrier signal from a carrier frequency oscillator 54 by the mixer 44, and the mixed signal is converted into a signal that has a carrier frequency. The modified signal is then routed through the frequency divider 93 and transmitted by the antenna 63 to the repeater office 1.

At the repeater office 1, the signal is received by the antenna 62, and passes through the frequency divider 92 to the mixer 45. The signal is then mixed with a carrier signal from a carrier frequency oscillator 55 and converted into a signal that has an IF band frequency. The converted signal that has an IF band frequency passes through a hybrid circuit 35 to an auxiliary signal demodulator 72 where it is demodulated and an auxiliary signal is extracted.

The auxiliary signal from the repeater office 1 is then inserted into a primary signal via a hybrid circuit 36 by an auxiliary signal modulator 23. The resultant signal is mixed with a carrier signal from a carrier signal oscillator 56 by the mixer 46, and converted into a signal that has a carrier frequency. The output of the mixer 46 is routed through the frequency divider 91 and transmitted by the antenna 61 to the terminal office 1.

At the terminal office 1, the signal is received by the antenna 60 and routed through the frequency divider 90 to the mixer 47. The signal is then mixed with a carrier signal from a carrier frequency oscillator 57 and converted into a signal that has an IF band frequency.

The converted signal that has an IF band frequency is distributed by a hybrid circuit 37, and the distributed signals are received as a primary signal and an auxiliary signal by a primary signal demodulator 81 and an auxiliary signal demodulator 73, respectively.

Figure 4:
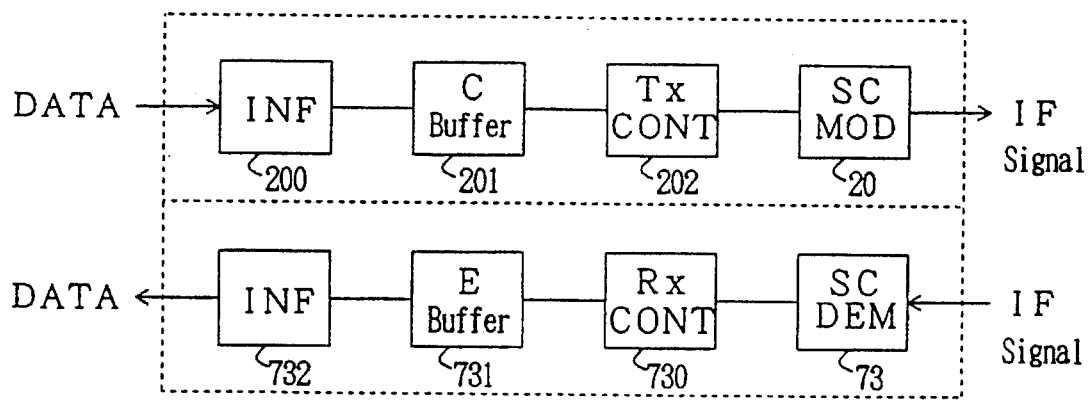
FIG. 4 is a block diagram illustrating a circuit structure that produces bursts for an auxiliary signal and reduces bursts to continuous signals.

FIG. 4 is a block diagram of one circuit arrangement example where the terminal offices 1 and 2 and the repeater office 1 in FIG. 1 each include an auxiliary signal modulator and auxiliary signal demodulator pair for producing auxiliary signal bursts and reducing bursts to continuous signals.

The auxiliary signal modulators 20, 21, 22, and 23 in FIG. 1 all have the same structure. The auxiliary signal demodulators 70, 71, 72, and 73 are also structured alike.

FIG. 4, therefore, shows the structure of an auxiliary signal controller of the embodiment that includes the auxiliary signal modulator 20 and the auxiliary signal demodulator 73 as examples. An interface circuit 200 receives auxiliary signal data for a baseband that corresponds to multiple channels, and performs conversion at a logic level.

As TDMA inherent processing, data compression along a time axis is performed. A compression buffer (C buffer) circuit 201 receives and compresses the output data of the interface circuit 200.

Figure 5:
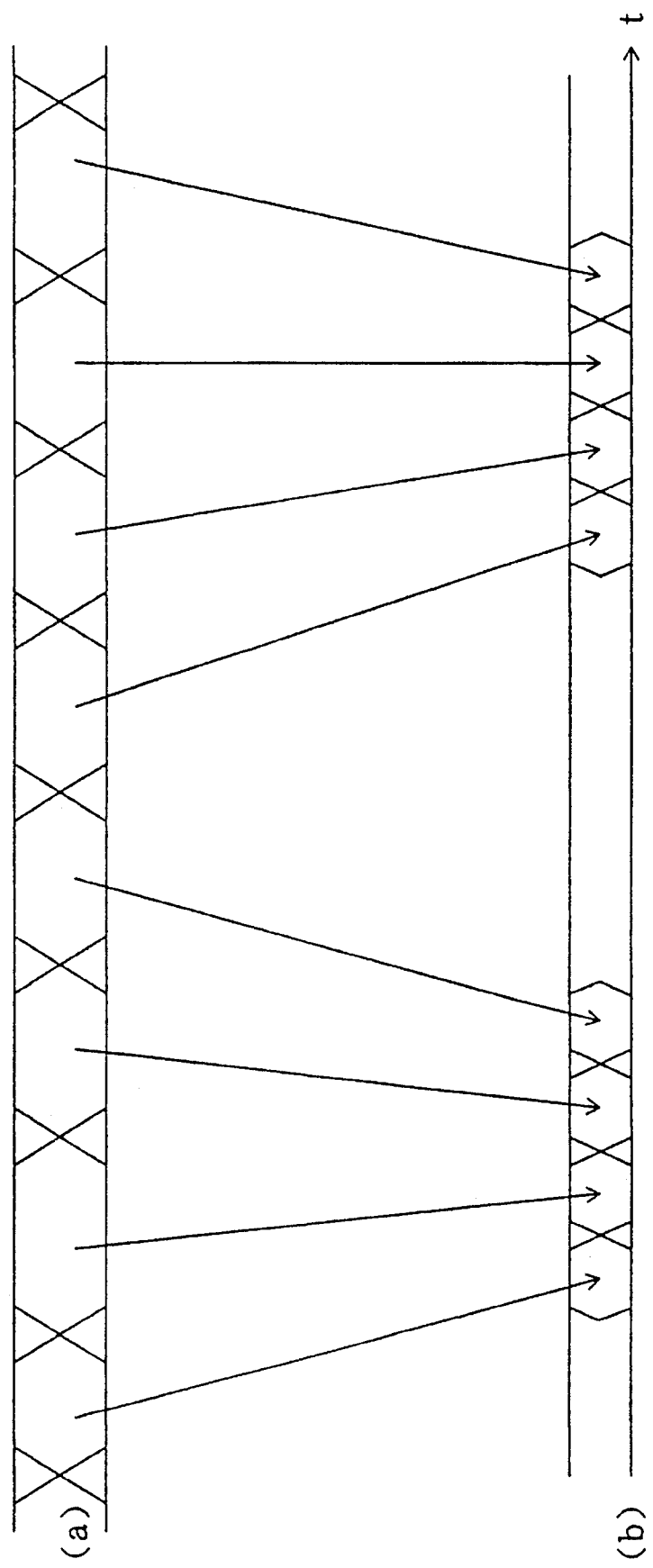
FIG. 5 is a diagram for explaining data compression.

The data compression process is as shown in FIG. 5. More specifically, in FIG. 5(a) is shown a continuous baseband data, which is the output of the interface circuit 200. During the data compression, the baseband data (a) is compressed along a time axis like (b) and converted into a burst.

A transmission controller (Tx Cont) 202 includes a counter that controls transmission timing. By employing its synthesizer, the transmission controller 202 employs time-sharing to synthesize or multiplex the above compressed auxiliary signal data for channels at a constant value timing that is held by the counter, and transmits the resultant data to the auxiliary signal modulator 20.

The constant count value is determined in accordance with various modifications of the present invention which will be described later.

Before a transmission controller 202 employs time-sharing to multiplex the data compressed by the C buffer circuit 201 to the auxiliary signal modulator 20 at a timing that is a constant count value, the transmission controller 202 also adds a control signal to each burst. The control signal will be explained later while referring to FIG. 6.

The output of the transmission controller 202 is sent to the auxiliary signal modulator 20. As described in FIG. 1, the data is then inserted into an unoccupied frequency area in the primary signal frequency domain shown in FIG. 3 and output as a signal with an IF band frequency. In this embodiment, a PSK modulator is employed for the auxiliary signal modulator 20.

In the reception side in FIG. 4, the frequency of a received signal is converted into an IF band frequency, and the converted signal is sent from the hybrid circuit 33 to the auxiliary signal demodulator 73, which is a PSK demodulator. The frequency of the signal is then demodulated into a baseband by the auxiliary signal demodulator 73.

The demodulated baseband signal is transmitted to a receive controller (Rx Cont) 730. The receive controller 730 has an A/D converter that converts the demodulated analog output by the auxiliary signal demodulator 73 into a digital signal.

The receive controller 730 further includes a detector that detects a unique word, which will also be described later while referring to FIG. 6, from the output of the A/D converter.

With the detected output of a unique word as a reference, a constant value is acquired by a counter circuit, provided in the receive controller 730, that measures time. In addition, a channel clock signal is generated based on an acquired constant value.

In consonance with the channel clock signal, the output of the A/D converter is distributed to every channel, and the distributed outputs are sent to an expansion buffer (E buffer) circuit 731. The demodulated burst signal serves as demodulated continuous auxiliary signal data that is obtained by the E buffer circuit 731 expanding a signal in (b) in FIG. 5 to a signal in (a) along a time axis for every channel. Subsequently, a logic level is converted by an interface circuit 732 and the converted data is reproduced and output as auxiliary signal data. FIG. 6 is a frame format for auxiliary signal bursts. In FIG. 6, the auxiliary signal bursts from the terminal office and from all the repeater offices constitute one frame of an auxiliary signal. In other words, in (a) in FIG. 6, for example, reference number 1 denotes an auxiliary signal burst that is transmitted by the terminal 1 and reference number 2 denotes an auxiliary signal burst that is transmitted by the repeater office 1. Also in (a) in FIG. 6, reference number 11 denotes an auxiliary signal burst that is transmitted by the terminal office 1 following the transmission of one frame.

Figure 6:
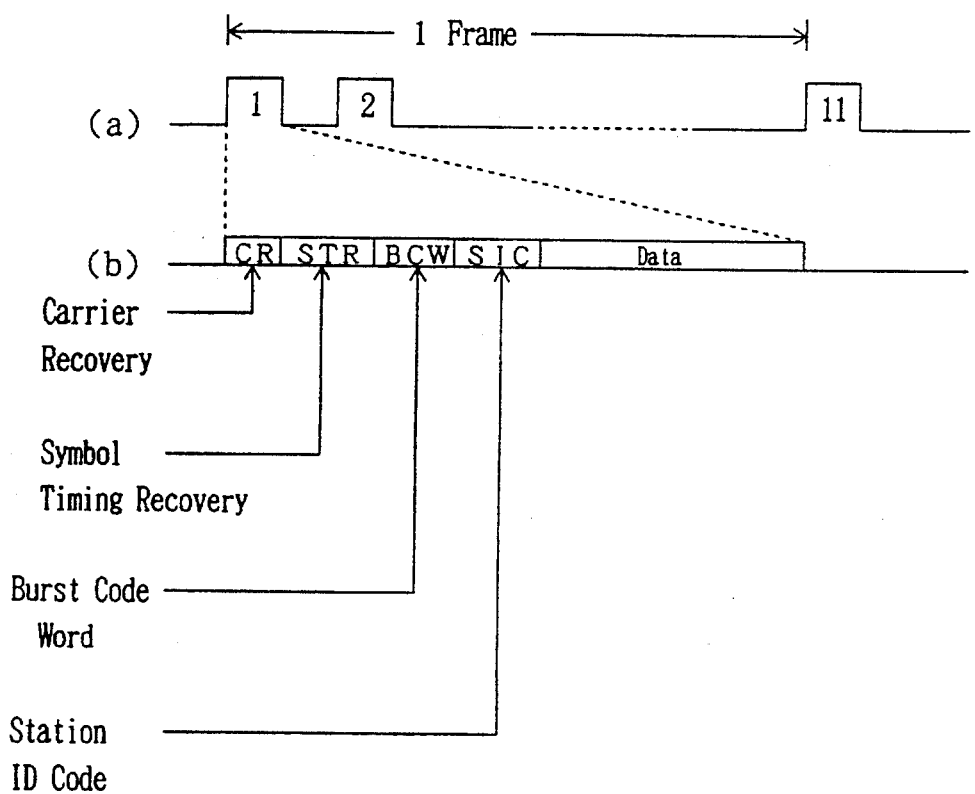
FIG. 6 is a frame format for auxiliary signal bursts.

In FIG. 6, (b) is an enlarged diagram showing the structure of one burst in one frame. As shown in (b), control signals CR, STR, BCW, and SIC are added to the head of the data fragments included in one burst.

CR represents a carrier recovery signal that is employed to demodulate the auxiliary signal. STR represents a symbol timing recovery signal that is employed to measure the timing for data bit transmission of the auxiliary signal.

Further, BCW, or a burst code word, is a unique word that is employed for burst frame synchronization. As previously explained in FIG. 4, when the unique word is detected, the counter in the receive controller 730 starts counting at the detected unique word.

SIC is a station identification code for identifying a terminal office, which is the transmission source of a burst, or a repeater office.

Figure 7:
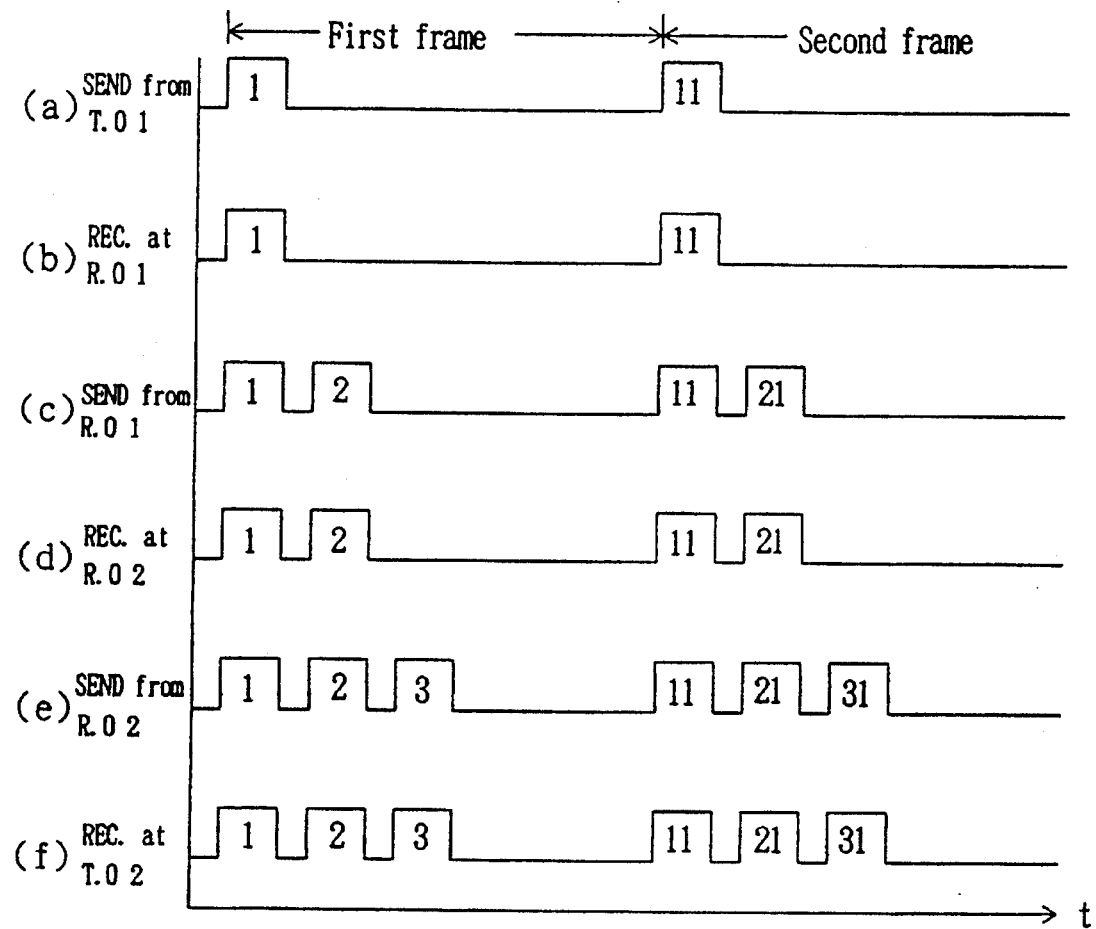
FIG. 7 is a timing chart for explaining the basic principle of the present invention.
Figure 8:
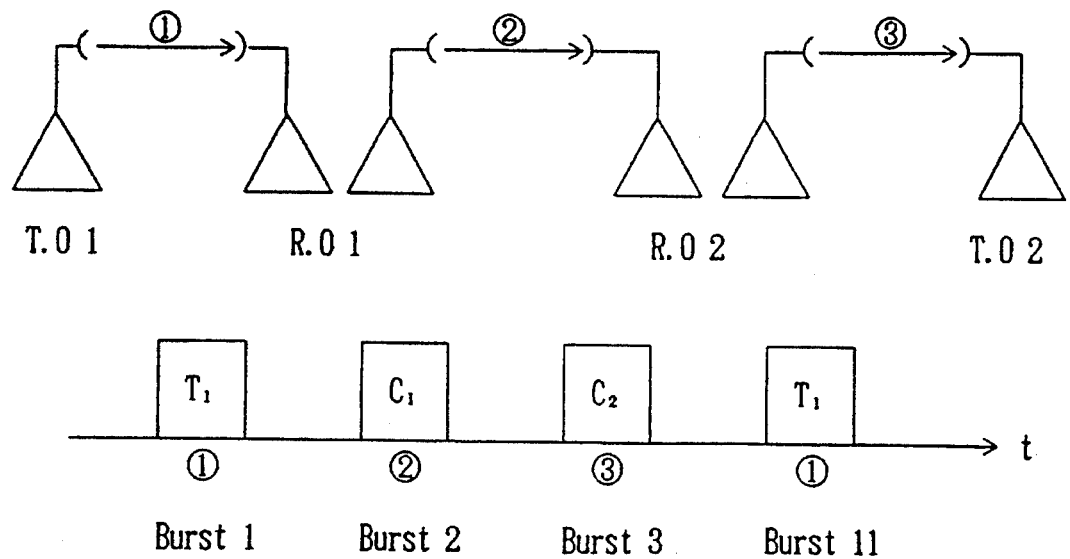
FIG. 8 is a diagram showing the order of transmission of auxiliary signals and signals that are received along a time axis.

To make it possible to better understand the present invention, FIG. 7 shows a timing chart for explaining the basic principle of an auxiliary signal transmission system according to the present invention that is controlled by the configuration in FIG. 1. FIG. 8 is a diagram for explaining the transmission order of the auxiliary signals that correspond to the timings in FIG. 7. As shown in FIG. 8, the auxiliary signal is transmitted between the terminal office 1, the repeater offices 1 and 2 and the terminal office 2.

In FIG. 7, (a) represents transmission bursts 1 and 11 for an auxiliary signal from the terminal office 1; (b) indicates the reception at the repeater office 1 of the transmission bursts 1 and 11 of the auxiliary signal from the terminal 1; and (c) indicates the transmission from the repeater office 1 to the repeater office 2 of bursts 2 and 21 together with the auxiliary bursts 1 and 11 of the terminal office 1.

In the same manner, the repeater office 2 receives the bursts 1, 2, 11, and 21 of the respective auxiliary signals from the terminal office 1 and the repeater office 1 (see (d) in FIG. 7), and transmits to the terminal office 2 bursts 3 and 31 of the auxiliary signal from the repeater office 2, together with the auxiliary signal bursts 1 and 2 from the terminal office 1 and the auxiliary signal bursts 2 and 21 from the repeater office 1 (see (e) in FIG. 7).

In FIG. 7, therefore, (f) shows the reception state at the terminal office 2 for the auxiliary signals that are transmitted in a time-sharing manner. In FIG. 7, the auxiliary signal bursts 1 and 11 from the terminal office 1, the auxiliary signal bursts 2 and 21 from the repeater office 1, and the auxiliary signal bursts 3 and 31 from the repeater office 2 are received as a time series. After the transmission frame (the first frame) of the auxiliary signal bursts 1, 2, and 3 are transmitted, the bursts 11, 21 and 31 are transmitted as the auxiliary signal bursts for the second frame.

FIG. 8 shows on the time axis the transmission order of the auxiliary signal and a signal received at the terminal office 2, corresponding to FIG. 7. In other words, the transmission is performed in the order of –!, –", –# from the terminal office 1 to the terminal office 2 via the repeater offices 1 and 2. The bursts 1, 2, 3, and 11 are sequentially received at the terminal office 2. That is, an auxiliary signal T1 from the terminal office 1, an auxiliary signal C1 from the repeater office 1 and an auxiliary signal C2 from the repeater office 2 are received sequentially.

According to the principle of the present invention, therefore, it is not necessary to cancel a received auxiliary signal to reproduce a received signal.

Figure 9:
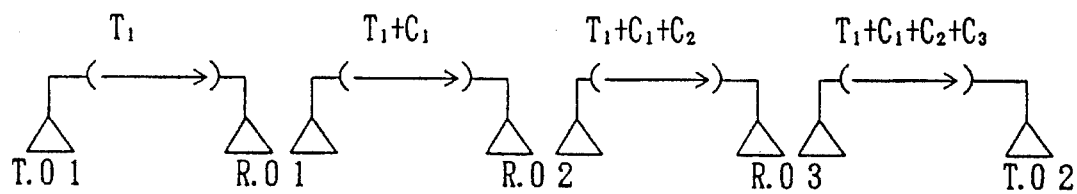
FIG. 9 is a block diagram illustrating a first application example for an auxiliary signal transmission system of the present invention.
Figure 10:
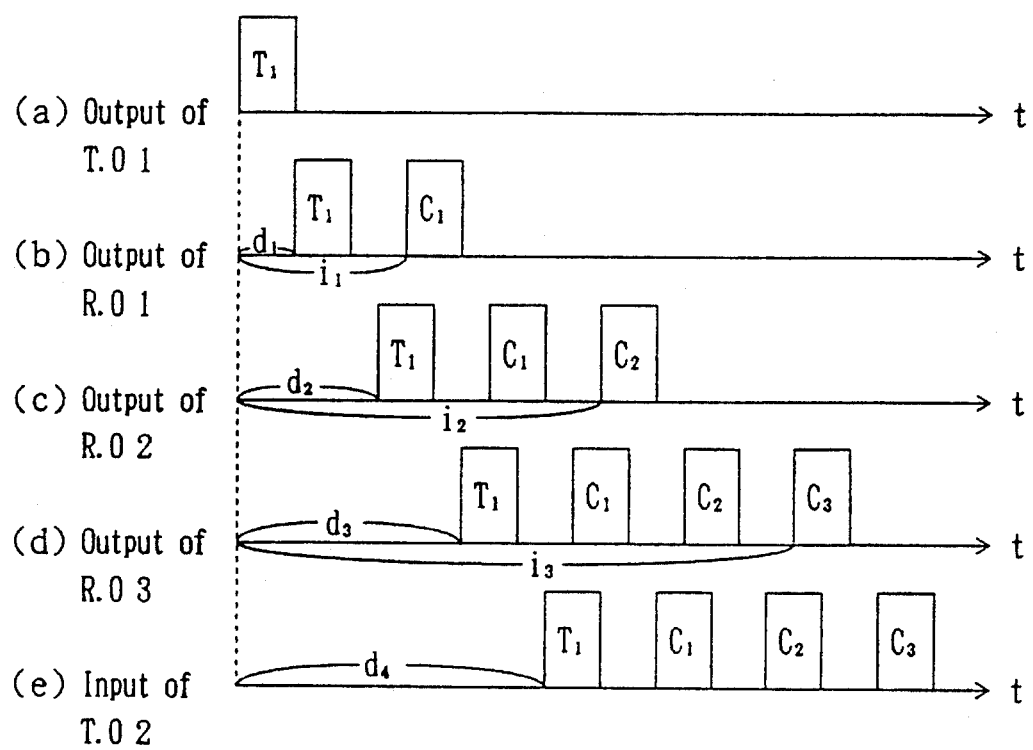
FIG. 10 is a timing chart that corresponds to the system in FIG. 9.

FIG. 9 shows the first example for the auxiliary signal transmission system of the present invention. In the system example synchronous establishment is enabled. FIG. 10 is a timing chart corresponding to FIG. 9. In this case, three repeater offices are employed.

In this system, reference data are transmitted independently along the upstream circuit and the down stream circuit. First, synchronization is established at all the repeater offices and terminal offices by employing the auxiliary signal T1 transmitted from the terminal office 1.

More specifically, (a) in FIG. 10 represents auxiliary signal T1 that is sent as reference data by the terminal office 1. As shown in (b) through (e), the auxiliary signal T1 is received at the repeater offices 1, 2, and 3 and the terminal office 2 at delay times d1, d2, d3 and d4, respectively.

Synchronization is established between the repeater offices by employing the auxiliary signal T1 from the terminal office 1 as a reference. When the repeater offices 1, 2, and 3 and the terminal office 2 receive the auxiliary signal T1 from the terminal office 1, the offices acknowledge the referential transmission time for the auxiliary signal T1 from the terminal office 1 by employing the previously set delay times d1, d2, d3 and d4.

Each office transmits the auxiliary signal after a predetermined time, which is individually designated for each office.

In other words, the auxiliary signal C1 from the repeater office 1 shown in FIG. 9 is transmitted after time i1 has elapsed following the reference time. In the same manner, the auxiliary signal C2 from the repeater office 2 is transmitted after time i2 has elapsed following the reference time. Further, the auxiliary signal C3 from the repeater office 3 is transmitted after time i3 has elapsed following the reference time. And as shown in FIG. 9 and in FIG. 10(*e*), after time d4 has elapsed following the reference time, the auxiliary signals T1, C1, C2, and C3 are multiplexed in a time-sharing manner and are received at the terminal office 2. The counter provided in the transmission controller 202, as described in FIG. 4, measures the elapse of the predetermined times that follow a reference time.

Figure 11:
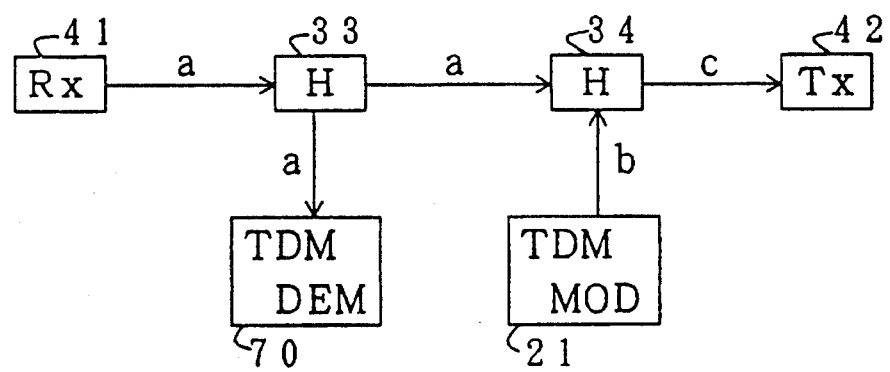
FIG. 11 is a diagram for further explaining received signals and transmitted signals at terminal offices and repeater offices that correspond to FIGS. 9 and 10.

FIG. 11 is a diagram for explaining a received signal and a transmitted signal at the terminal offices and repeater offices in FIGS. 9 and 10. The same or identical symbols and numbers that are used for the repeater office 1 in FIG. 1 are employed for this diagram.

In FIG. 11, "a" denotes a primary signal and an auxiliary signal that are routed up to an immediately preceding office. As TDMA processing is performed for an auxiliary signal for multiple channels at the transmission side, the auxiliary signal demodulator 70 described in FIG. 1 demodulates that signal in a time-sharing manner. In the auxiliary signal demodulator 70, therefore, an auxiliary signal required for a current office is multiplexed and separated.

Further, "b" denotes an auxiliary signal that is generated by the auxiliary signal modulator 21 for insertion by the repeater office 1. This auxiliary signal is mixed with the signal "a" by the hybrid circuit 34 and the resultant signal "c" is output. The signal "c", which includes the primary signal, the auxiliary signal transmitted up to the immediately preceding office and the auxiliary signal of the current office, is transmitted to the next repeater office, as shown in FIG. 9.

Figure 12:
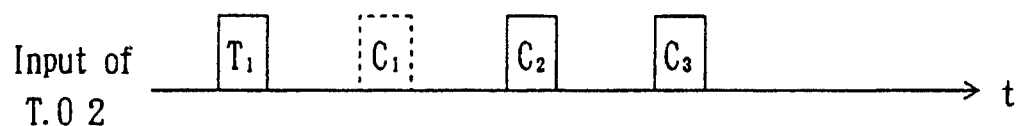
FIG. 12 is an explanatory diagram for a received signal when an auxiliary signal C1 is not transmitted from a repeater office 1.

Even when, for example, the auxiliary signal C1 is not transmitted from the repeater office 1, the next repeater office 2 can transmit the auxiliary signal C2 after a predetermined time has elapsed following the transmission of the auxiliary signal T1 by the terminal office 1. In this manner, a linking effect on the next repeater office can be prevented, and as shown in FIG. 12, the terminal office 2 can receive auxiliary signals from other repeater offices while skipping the reception of the auxiliary signal C1.

Figure 13:
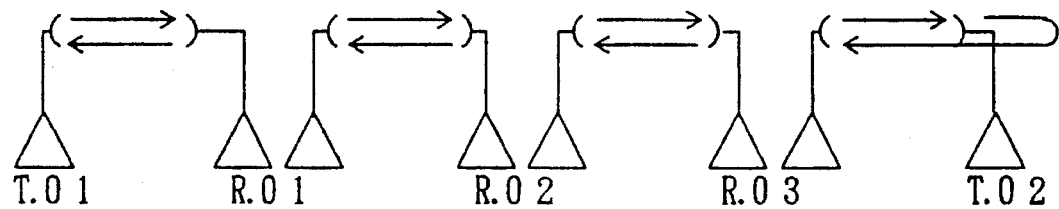
FIG. 13 is a diagram for explaining how an auxiliary signal T1 is returned by a terminal office 2.

FIG. 13 shows another extended example where the auxiliary signal T1, which is a reference signal from the terminal office 1, is returned by the terminal office 2. With this process, the same reference signal can be used to synchronize the upstream and downstream circuits with each other and only one reference office is required.

Figure 14:
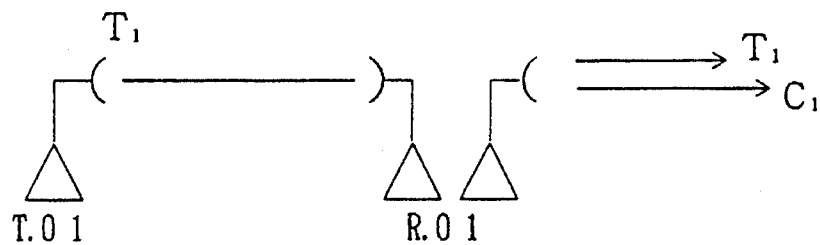
FIG. 14 is a diagram showing a second application example for an auxiliary signal transmission system of the present invention.
Figure 15:
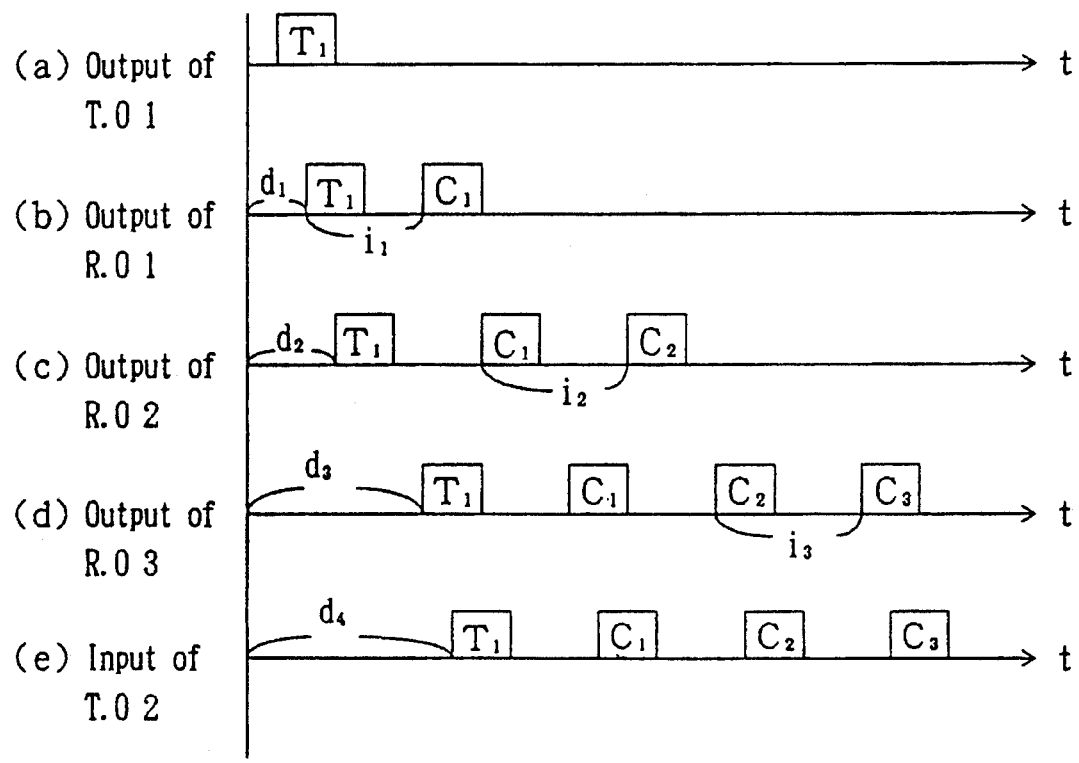
FIG. 15 is a timing chart that corresponds to the system in FIG. 14.

In FIG. 14 is the second example of the auxiliary signal transmission system of the present invention. This system prevents auxiliary signal transmission overlap by having the current office transmit the auxiliary signal after it has confirmed that the immediately preceding office has transmitted the signal. FIG. 15 is a timing chart for FIG. 14.

The transmission of the auxiliary signal from the terminal office 1 to the repeater office 1 will be described as an example while referring to FIG. 14. In FIG. 14, T1 indicates an auxiliary signal that serves as a reference signal to be transmitted from the terminal office 1. The repeater office 1 receives the auxiliary signal T1 from the terminal office 1, and without changing it, relays it to the next repeater office. The repeater office 1 also transmits auxiliary signal C1 after a predetermined time has elapsed following the transmission of the auxiliary signal T1.

In FIG. 15, (a) represents the auxiliary signal T1 that is output as a reference signal from the terminal office 1. The repeater office 1 receives the auxiliary signal T1 from the terminal office 1 at the delay time d1, and relays the unchanged signal to the next repeater office. After a predetermined time i1 has elapsed following the relay time, the repeater office 1 transmits its own auxiliary signal C1.

In the same manner, when a predetermined time i2 has passed since the repeater office 2 has confirmed that the auxiliary signal C1 from the repeater office 1 has been transmitted, the repeater office 2 transmits its own auxiliary signal C2. Further, when a predetermined time i3 has elapsed following the confirmation by the repeater office.3 that the auxiliary signal C2 from the repeater office 2 has been transmitted, the repeater office 3 transmits its own auxiliary signal C3.

The terminal office 2 can, therefore, receive the auxiliary signals T1, C1, C2 and C3 in a time-sharing manner and with no signal overlap, as shown in (e) in FIG. 15.

It is desirable that a predetermined time elapse before the transmission of the auxiliary signal from a repeater office. It has been confirmed that the timing values in accordance with which auxiliary signals from the preceding offices are relayed and transmitted should be equal, i.e., $i=i1=i2=i3$, in order to thoroughly prevent the overlapping of the auxiliary signals T1, C1, C2, and C3.

Figure 16:
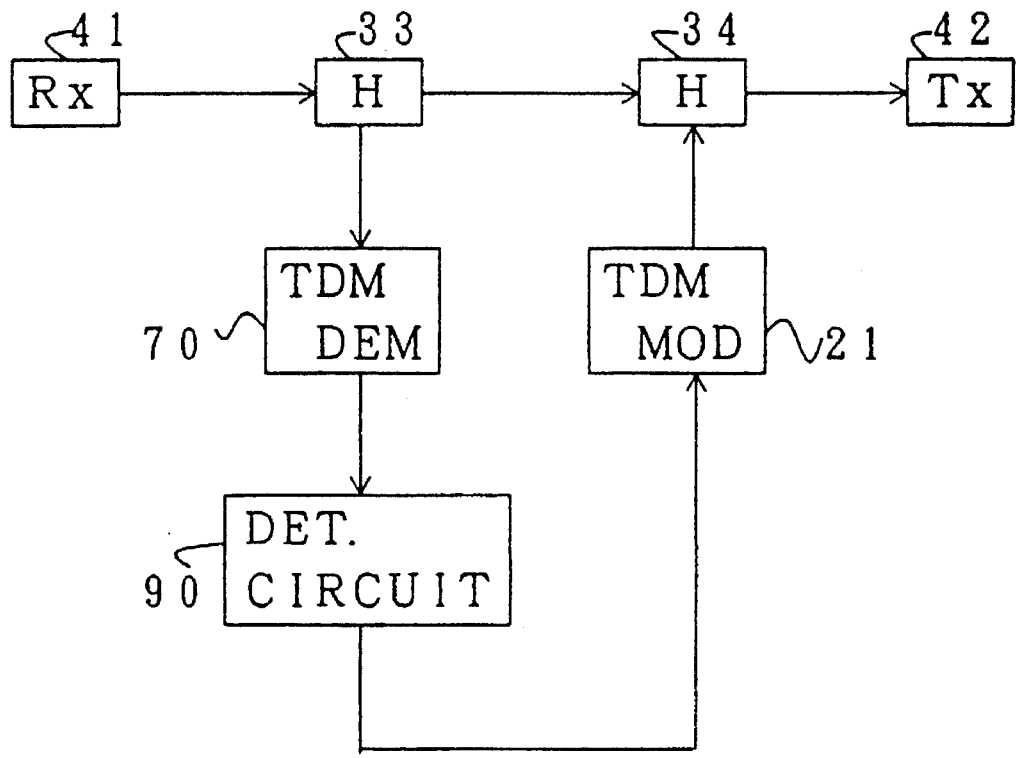
FIG. 16 is a diagram for explaining the operation of terminal offices and repeater offices that correspond to FIGS. 14 and 15.

FIG. 16 is a diagram for explaining further a received signal and a transmitted signal at the terminal and repeater offices corresponding to FIGS. 14 and 15. The symbols and numbers that are used for the repeater office 1 in FIG. 1 are also used for this example.

In FIG. 16, the components are the same as described in FIG. 11, except for a preceding office data transmission determining circuit 90. That is, the preceding office data transmission determining circuit 90 that is included in this example determines whether the data (an auxiliary signal) of the preceding office has been transmitted.

This circuit 90 has a timer or a delay circuit to verify the lapse of a predetermined time i following the transmission of data by the preceding office.

When the determining circuit 90 verifies the lapse of the determined time i, its own auxiliary signal is inserted into the modulator 21. The hybrid circuit 34 adds that signal to data from the preceding office and outputs the result.

The timer or the delay circuit can be replaced with the counter in the transmission controller 202 described for FIG. 4.

While referring to FIGS. 14 to 16, an explanation has been given of the case where, to transmit its own auxiliary signal, a repeater office verifies that a predetermined time i has elapsed following the confirmation that an auxiliary signal by the preceding office has been relayed. The circuit 90 in FIG. 16, which determines whether data (an auxiliary signal) has been transmitted by the preceding office, may be employed to verify the reception of data from the preceding office.

In other words, a repeater office can transmit its own auxiliary signal after a predetermined time has elapsed following the reception of data (an auxiliary signal) from the preceding office. There is no overlapping of the auxiliary signals in this case also.

Figure 17:
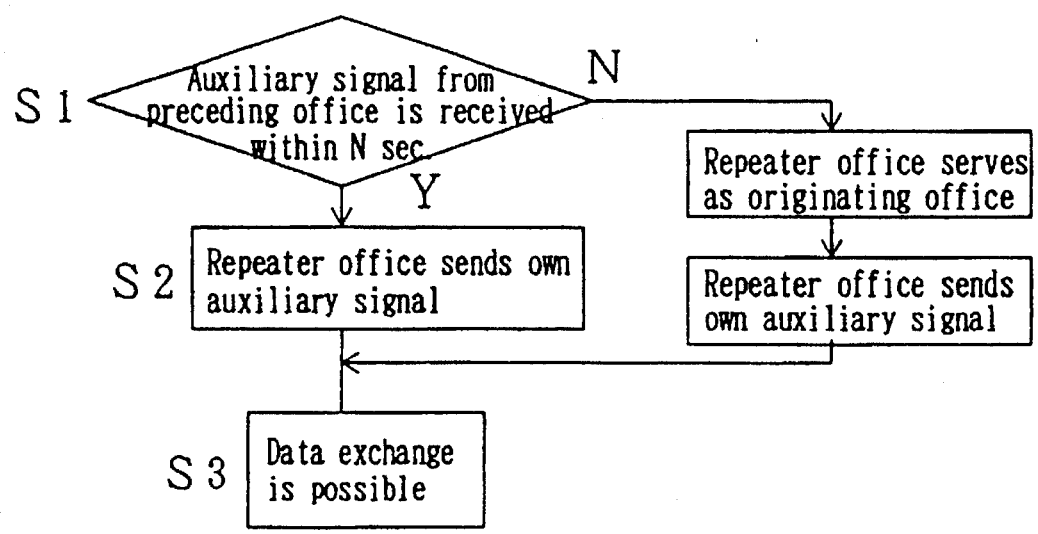
FIG. 17 is a flow chart showing the processing when an auxiliary signal is not transmitted by an immediately preceding terminal office within a predetermined time (for example, N seconds)
Figure 18:
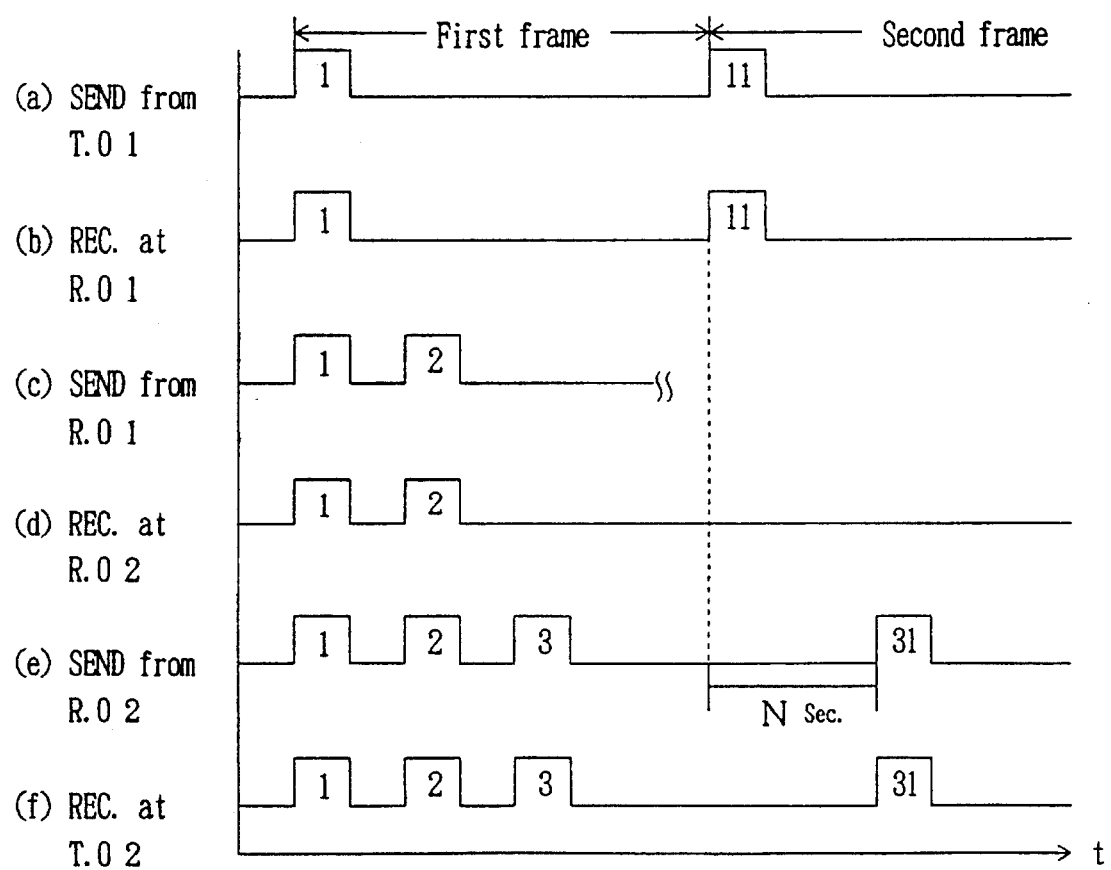
FIG. 18 is a timing chart that corresponds to the operation in FIG. 17.

FIG. 17 is a still further example of the present invention showing the processing that is performed when an auxiliary signal has not been transmitted by an immediately preceding office during a predetermined period (e.g., N seconds). FIG. 18 is a timing chart for the processing in FIG. 17.

The intervals at which auxiliary signals from a preceding office will be received are detected at a repeater office (step S1). When an auxiliary signal is received from the preceding office within a predetermined allowable time, N seconds, the repeater office sends, at a given timing, its own auxiliary signal to the next repeater office (step S2).

In FIG. 18, an auxiliary signal from the repeater office 1 cannot be transmitted during the second frame interval. In such a case, the lapse of N seconds is detected by referring to the auxiliary signal 11 of the terminal office 1, which serves as the reference for the second frame (step S1).

When the lapse of N seconds has been detected, the repeater office 1 is determined to be damaged. Hereafter, the repeater office 2 serves as an originating office (step S4), and sends its own auxiliary signal 31 as a reference to the following repeater office or a terminal office (step S5).

By performing this processing, data exchange is possible between the repeater office 2 and the following repeater offices or the terminal office 2. For detection of the lapse of N seconds for the individual repeater offices, it is preferable that the timing intervals (N seconds) for the individual repeater offices differ so that the transmission overlap of auxiliary signals can be prevented.

In the above processing, counting a predetermined number of bursts may be employed instead of the detection of specific time lapse, N seconds.

In the above described example, the structure of the repeater office can be the same as in FIG. 16, except that the preceding office data transmission determining circuit 90 is altered.

That is, the repeater office may be designed as follows. When the auxiliary signal is not received from the preceding office during a given time, N seconds, the preceding office data transmission determining circuit 90 issues a command to the modulator 21 to send an auxiliary signal from their repeater office. In response to the command, the modulator 21 can transmit its own auxiliary signal while the repeater office serves as an originating office.

Figure 19:
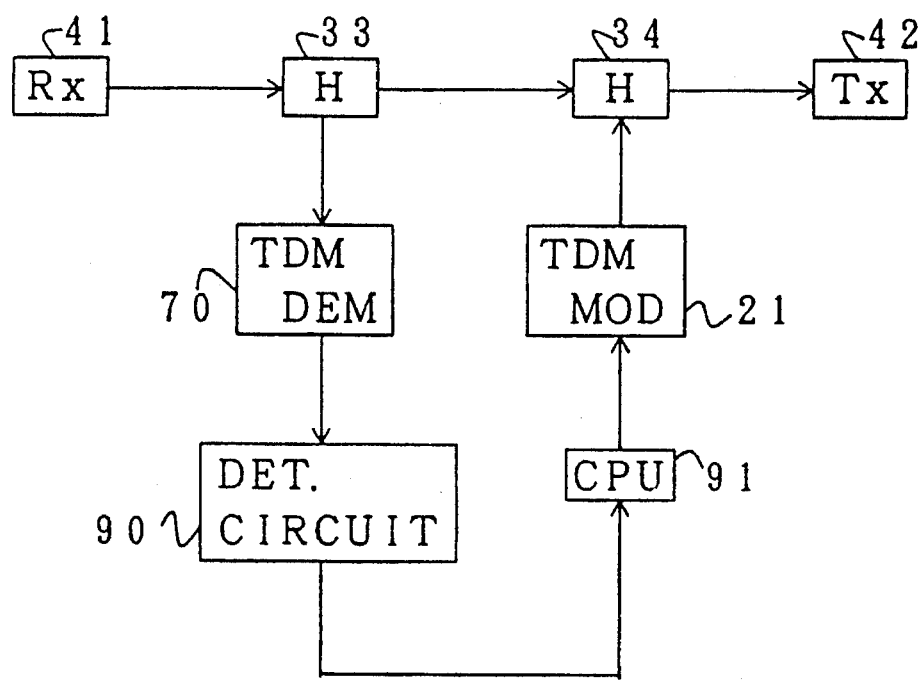
FIG. 19 is a diagram for explaining the switching transmission routes when an auxiliary signal is not transmitted by an immediately preceding office.

In FIG. 19, an extended example for the present invention, a transmission path is altered when the auxiliary signal is not transmitted by the immediately preceding office. More specifically, since a transmission path might become defective when the auxiliary signal is not transmitted by the preceding office, the transmission path can be altered by changing a modulation frequency to ensure continuity of communication.

To do this, a CPU 91 is added to the arrangement described in FIG. 16. In consonance with the output of the data transmission determining circuit 90, the CPU 91 controls a synthesizer (not shown) of the modulator 21 to alter a modulation frequency. In this manner, a transmission path can be changed.

Figure 20:
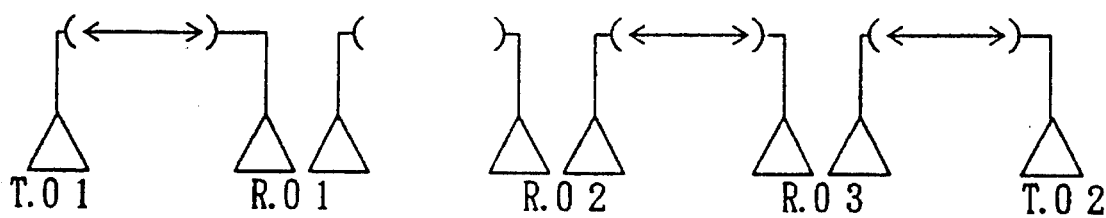
FIG. 20 is an explanatory diagram for bidirectional signal transmission.

FIG. 20 shows the processing that is performed when an auxiliary signal has not been transmitted after a given time has elapsed. It is now presumed that the preceding office data transmission determining circuit 90 at the repeater office 2 cannot detect the reception of an auxiliary signal from the repeater office 1 after a given time has elapsed.

In such a case, a transmission path is altered to return a signal by the repeater office 1, thus providing bidirectional signal transmission between the terminal office 1 and the repeater office 1. In the same manner, a signal is also returned by the repeater office 2 so as to provide bidirectional signal transmission between the repeater offices 2 and 3 and the terminal office 2. At this time, the terminal office 2 also serves as an originating office and can transmit an auxiliary signal.

In the arrangement in FIG. 19, alteration of a transmission path can be controlled by the CPU 91, as described above.

Figure 21:
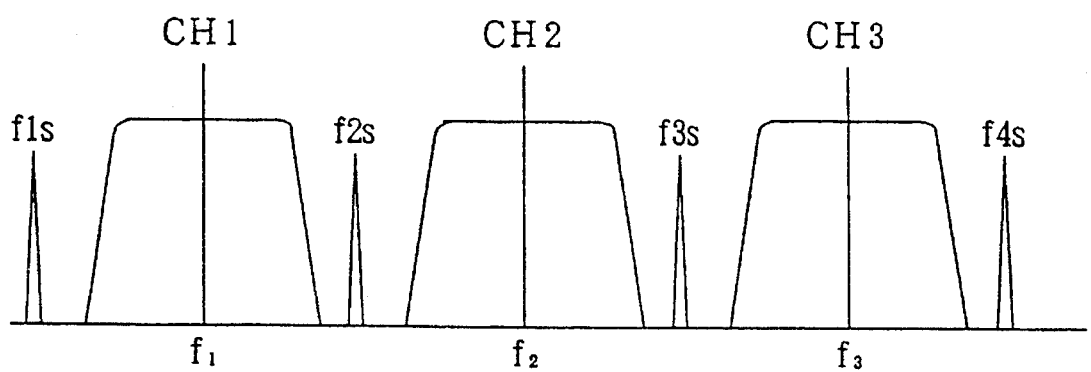
FIG. 21 is a diagram for illustrating the frequency allocation to explain one example employing an auxiliary service channel signal having a suitable channel quality of frequency.

FIG. 21 shows a frequency allocation for explaining one example. In the example, the auxiliary signal having suitable frequency is adaptively employed with regard to a channel quality on the transmission of the auxiliary signal described previously in each of embodiments.

When the three channels CH1 to CH3 (f1, f2, f3) are employed as the primary signal frequencies, as described above, either of the frequencies f1s to f4s, which are adjacent to these primary signal frequencies, can be used for the auxiliary signal. In the case where the channel quality becomes lower on the frequency fc1 due to fading, it is possible to overcome the fading by employing either of other frequencies f2s, f3s and f4s.

Figure 22:
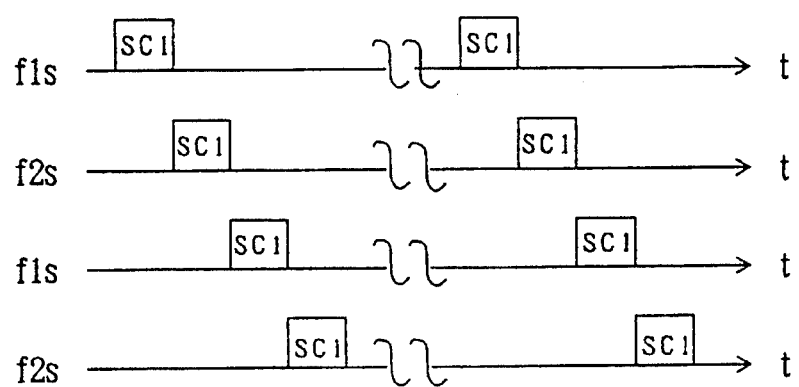
FIG. 22 is a timing chart showing one embodiment of an auxiliary signal transmission burst format of the terminal 1 according to the frequency allocation in FIG. 21.

FIG. 22 is a timing chart showing one example of transmitted burst format of the terminal 1 with regard to the relation of frequency in FIG. 21.

It will be now considered that the two intermediate repeater offices 1 and 2 are allocated between a pair of terminals 1 and 2.

In FIG. 22, the auxiliary signal SC1 from the terminal 1, employing frequencies f1s to f4s is transmitted to the repeater office 1 after each the transmission timing of the frequencies f1s to f4s is shifted as time series, respectively.

Figure 23:
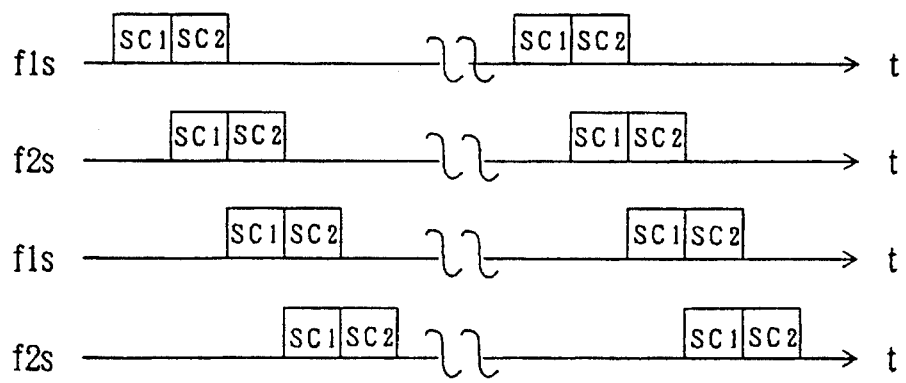
FIG. 23 is a timing chart showing one example of an output format of an intermediate repeater office 1 in the embodiment of FIG. 22.
Figure 24:
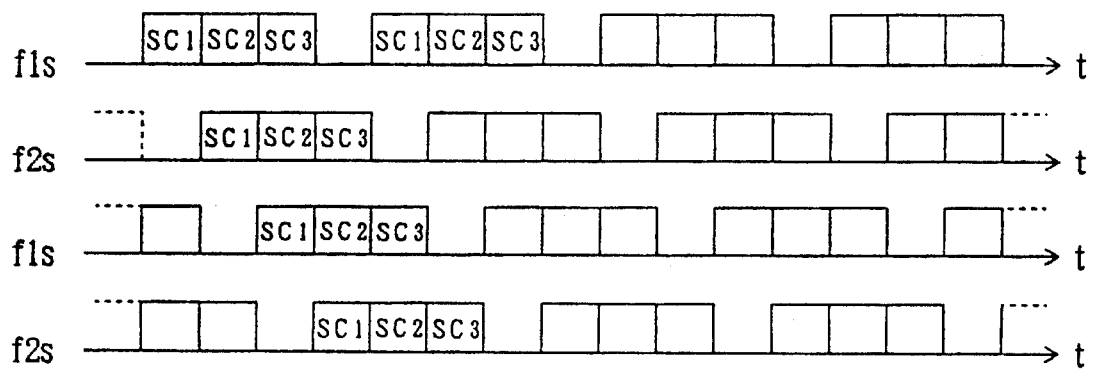
FIG. 24 is a timing chart showing one example of an auxiliary signal receipt burst format of the terminal 2 in the embodiment of FIG. 22.

FIG. 23 is a timing chart showing one example of the output burst format of the intermediate repeater office 1 in the example of FIG. 21. The chart shows the auxiliary signal SC1 transmitted from the terminal 1 as described in FIG. 22 is further added to the auxiliary signal SC2 by the intermediate repeater office 1. FIG. 24 is a timing chart further showing one example of the receipt burst format of the terminal 2 in the embodiment of FIG. 21.

In the above-described FIGS. 22 through 24, in the case where the channel quality is deteriorated by fading and the like, when the intermediate repeater offices 1 and 2 and the terminal 2 receive on the frequency fc1, temporarily, the reception frequency of the intermediate repeater offices 1 and 2 and the terminal 2 can alter to the other frequencies fc2 to fc4 and the offices can receive the auxiliary signal having the appropriate frequency.

Figure 25:
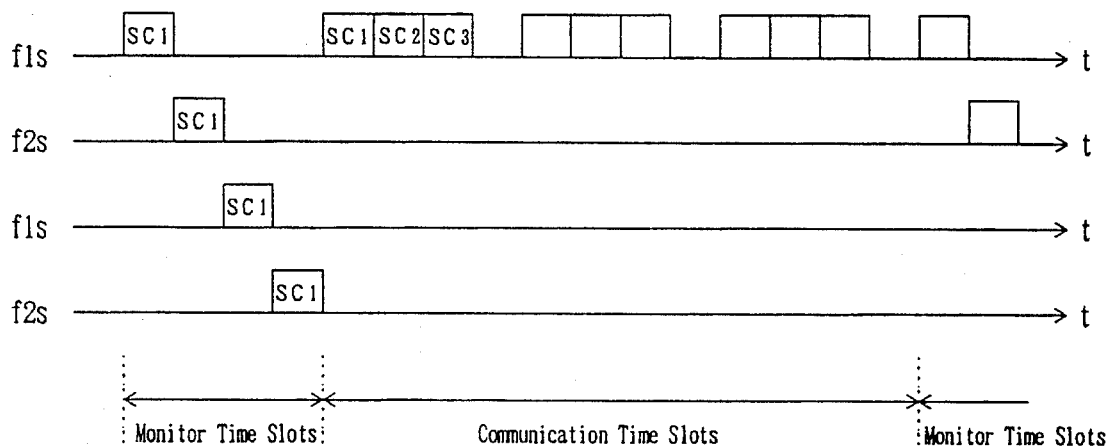
FIG. 25 is a timing chart showing one extended example of the embodiments of FIGS. 22 through 24, providing monitor time slots indicating the channel condition.

FIG. 25 is a timing chart showing the extended example of the embodiments shown in FIGS. 22 through 24. In the example, the monitor time slots monitoring the channel condition are provided as shown in FIGS. 22 through 24. The monitor time slots have the period for monitoring the channel condition. The terminal 2 receives the burst signal for monitoring the channel condition which is transmitted within the period for monitoring the channel condition and notifies the suitable frequency to the terminal 1.

The auxiliary signal is, therefore, transmitted by employing the notified suitable frequency. The example of FIG. 25 shows the case where the frequency fc1 is used as the suitable frequency. Accordingly, the intermediate repeater offices 1 and 2 and the terminal 2 can receive the auxiliary signal on the frequency fc1.

Figure 26:
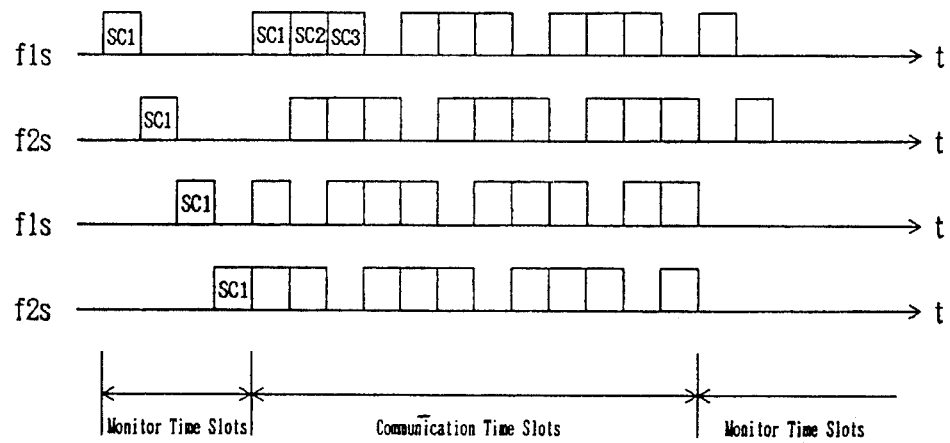
FIG. 26 is a timing chart showing the other extended example of the embodiments of FIGS. 23 through 24, providing monitor time slots indicating the channel condition.

FIG. 26 is a timing chart further showing the extended example of the embodiment shown in FIG. 25. As well as the example of FIG. 25, the time slots for monitoring the channel condition within the predetermined period are provided.

In this embodiment, the burst for monitoring is received within the time slot period for monitoring the channel condition on the intermediate repeater offices 1 and 2 and the terminal 2 to obtain the suitable frequency. Hereinafter, the auxiliary signal having the obtained suitable frequency is received.

Consequently, since the transmitted burst exits on all frequencies fc1 to fc4, in the embodiment of FIG. 26, in comparison with that of FIG. 25, it becomes possible to select the optional frequency on the receipt side, so that there is no need to notify the obtained suitable frequency to the terminal 1, unlike the embodiment shown in FIG. 25. Further, in the above-described embodiment, it is possible to obtain the channel condition according to the symbol error rate, the size of the receipt level and error signal of a transversal filter.

In the embodiments of the present invention as described above, a circuit that cancels an auxiliary signal in order to demodulate a primary signal is not required. The structure of the device can therefore be simplified. Also, one terminal office and multiple repeater offices can be supervised by the other terminal office.

According to the present invention, the auxiliary signal is inserted into the vacant area in the frequency band of the primary signal. Further, a timing at which an auxiliary signal, which is inserted into the primary signal, is to be transmitted to multiple repeater offices can be controlled in a time-sharing manner.

The repeater offices are synchronized with each other by referring to the auxiliary reference signal from the terminal office. The insertions of the auxiliary signals from the repeater offices can be carried out in various modes by referring to the auxiliary signal from the terminal office.

It is to be understood that the present invention is not limited to the embodiments described above. Further, the present invention is intended to cover any modifications and changes as may fall within the scope or spirit of the following claims.

What is claimed is:

1. An auxiliary signal transmission system which transmits a plurality of primary signals multiplexed within a transmission frequency bandwidth with auxiliary signals, the system comprising:

a first terminal office for multiplexing a plurality of primary signals within a transmission frequency bandwidth, inserting a first auxiliary signal in a vacant frequency area of the transmission frequency bandwidth and transmitting the multiplexed primary signals and the first auxiliary signal;

a plurality of repeater offices, each for receiving and repeating the multiplexed primary signals and the first auxiliary signal sent from a preceding one of said plurality of repeater offices, for inserting a corresponding second auxiliary signal in the vacant frequency area of the transmission frequency bandwidth and for transmitting the inserted corresponding second auxiliary signal, in a time series manner; and a second terminal office for receiving the transmitted multiplexed primary signals and the first and the corresponding second auxiliary signals.

2. The auxiliary signal transmission system according to claim 1, wherein each of the plurality of repeater offices transmits the corresponding second auxiliary signal inserted in the vacant frequency area of the transmission bandwidth after a predetermined period from the timing of transmitting the first auxiliary signal from the first terminal office so that the first and the corresponding second auxiliary signals are transmitted in the time series manner.

3. The auxiliary signal transmission system according to claim 2, wherein the predetermined period is different for each of the plurality of repeater offices.

4. The auxiliary signal transmission system according to claim 2, wherein each of said plurality of repeater offices serves as an originating office and transmits the first auxiliary signal to a next one of said plurality of repeater offices when the first auxiliary signal is not received for a predetermined period from the timing of transmitting the first auxiliary signal from the first terminal office.

5. The auxiliary signal transmission system according to claim 4, wherein the predetermined period corresponds to an interval during which predetermined burst signals are not received.

6. The auxiliary signal transmission system according to claim 4, wherein a transmission path is altered when the first auxiliary signal is not received for a predetermined period from the timing of transmitting the first auxiliary signal from the first terminal office and the one originating office transmits the first auxiliary signal to a next one of said plurality of repeater offices via the altered transmission path.

7. The auxiliary signal transmission system according to claim 6, wherein the transmission path is altered so as to provide bidirectional signal transmission between said terminal and repeater offices or between said plurality of repeater offices while eliminating a failure transmission span.

8. The auxiliary signal transmission system according to claim 1, wherein the first auxiliary signal is returned back from the second terminal office.

9. The auxiliary signal transmission system according to claim 1, wherein each of the plurality of repeater offices transmits the corresponding second auxiliary signal inserted in the vacant frequency area of the transmission bandwidth after a predetermined period from the timing of repeating the first auxiliary signal received from a preceding one of said plurality of repeater offices so that the first and the corresponding second auxiliary signals are transmitted in the time series manner.

10. The auxiliary signal transmission system according to claim 9, wherein the predetermined period is common for said plurality of repeater offices.

11. The auxiliary signal transmission system according to claim 1, wherein each of the plurality of repeater offices transmits the corresponding second auxiliary signal inserted in the vacant frequency area of the transmission bandwidth after a predetermined period from the timing of receiving the first auxiliary signal received from a preceding one of said plurality of repeater offices so that the first and the corresponding second auxiliary signals are transmitted in the time series manner.

12. The auxiliary signal transmission system according to claim 11, wherein the predetermined period is common for said plurality of repeater offices.

13. The auxiliary signal transmission system according to claim 1, wherein the vacant frequency area to which the first and the corresponding second auxiliary signals are inserted is a frequency area where channel quality becomes the most suitable.

14. The auxiliary signal transmission system according to claim 13, wherein the frequency area where channel quality becomes the most suitable is determined by providing a time slot period preceding the transmission timing of said plurality of primary signals during which a plurality of burst signals are transmitted on a plurality of vacant frequency areas within the transmission frequency bandwidth and selecting one of said plurality of vacant frequency areas which gives the most suitable channel quality from said plurality of vacant frequency areas.

* * * * *